Patented Oct. 2, 1945

2,385,862

UNITED STATES PATENT OFFICE 2,385,862

STILBENE DYESTUFFS AND PROCESS FOR THEIR MANUFACTURE

Ernst Keller, Basel, Switzerland, assignor to J. R. Geigy A. G., Basel, Switzerland, a firm No Drawing. Application January 16, 1942, Serial No. 427,062. In Switzerland November 28, 1940

15 Claims. (Cl. 260—143)

It is known to condense dinitro stilbene disulfonic acid, dinitrodibenzyl disulfonic acid or conversion products of p-nitrotoluene sulfonic acid with aromatic amino compounds especially aminoazo dyestuffs in various proportions and under various conditions in the presence of alkalis.

It has now been found in a surprising manner that according to the above reaction valuable new condensation products are obtained by wholly or partly replacing the known amino compounds by amino diaryl triazols, which contain at least one sulfonic acid group and/ or carboxylic acid group. It is immaterial to which of the two aryl radicals the amino group is bound. Only one or both aryl radicals may contain sulfonic acid and/or carboxyl groups and, if necessary, suitable further substituents, the sole condition being that the aminoaryl radical only contains substituents in positions which do not prevent the condensation. The condensation of these amino compounds with dinitrostilbene disulfonic acid or analogues thereof may be effected in various ways. There are mentioned particularly: reaction by reflux or under pressure; use of the condensation components in molecular or suitable proportions; use of mixtures of aromatic amino compounds already used for this reaction with the amino triazol derivatives now proposed according to the invention or mixtures of the last mentioned compounds.

Particularly important among the aforesaid amino compounds are the amino azo dyestuffs which in o,o'-position to the azo group contain metallisable substituents or their metal complex compounds, especially copper complex compounds, as for instance described in applicant's U. S. patent application Ser. No. 293,483, filed September 5, 1939, now Patent No. 2,276,202, and U. S. patent application Ser. No. 427,061, filed on even date herewith, now Patent No. 2,333,427. The condensation products may also be treated in known manner with oxidising and/or, in so far as metallisable groups are present, with metal-yielding agents.

Hereinafter some triazols which are used according to the invention are mentioned:

2 - (4'' - aminophenyl) - (naphtho-1':2':4:5-triazol) -4':8'-disulphonic acid,
2 - (4'' - aminophenyl) - (naphtho-1':2':4:5-triazol) -3':8'-disulfonic acid,
2 - (3'' - aminophenyl) - (naphtho-1':2':4:5-triazol) -5':7' disulfonic acid,
2 - (4'' - aminophenyl) - (naphtho-1':2':4:5-triazol) -5':7' - disulfonic acid,
2 - (4'' - aminophenyl) - (naphtho-1':2':4:5-triazol) 3':6':8'-trisulfonic acid.

According to known methods of production (see, for example, Beilstein, vol. 26, page 318, and also German Patent No. 174,548 according to which the compound of the formula

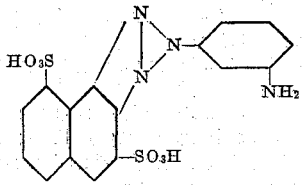

is prepared, it is possible to produce the following compounds not described hitherto in publications:

2 - (4'' - aminophenyl) - (naphtho-1':2':4:5-triazol) -6':8'-disulfonic acid,
2 - (4'' - aminophenyl) - (naphtho-1':2':4:5-triazol) -4'-sulfonic acid,
2 - (4'' - aminophenyl) - (naphtho-1':2':4:5-triazol) -6'-sulfonic acid,
2 - (4'' - amino - 2'' - sulfophenyl) - (naphtho-1':2':4:5-triazol),
2 - (4'' - amino - 2'' - sulfophenyl) - (naphtho-1':2':4:5-triazol) -6'-sulfonic acid,
2 - (3'' - amino - 4'' - chlorophenyl) - (naphtho-1':2':4:5-triazol) -5':7'-di-sulfonic acid,
2 -(4'' - amino - 2''-methoxyphenyl) - (naphtho-1':2':4:5-triazol) -5':7'-di-sulfonic acid,
2 - (4'' - amino - 2''-methoxyphenyl) -naphtho-1':2':4:5-triazol) -6'-sulfonic acid,
2 - (3'' - amino - 4'' - methylphenyl) - (naphtho-1':2':4:5-triazol) -5':7'-disulfonic acid,
2 - (4'' - amino-3''-methyl-6''-methoxyphenyl) - (naphtho-1':2':4:5-trazol) -6'-sulfonic acid,
2- and 4 - (4'' - amino - 6'' – sulfonaphthyl-1) - (naphtho-1':2':4:5-triazol) -6'-sulfonic acid.

From the series of benzo-triazols there are mentioned for example the following compounds, which can all be produced by the method which has become known for 5-amino-2-(4'-sulfophenyl) -1:3-benzotriazol:

5-amino-2-(3'-sulfophenyl) -1:3-benzotriazol,
5 - amino - 2 - (4' - methyl - 3' - sulfophenyl) - 1:3-benzotriazol,
5 - amino - 2 - (2':4' - dimethyl - 6' - sulfophenyl) -1:3-benzotriazol,
5 - amino - 2 - (2':5' - dimethyl - 4' - sulfophenyl) -1:3-benzotriazol,
5-amino-2-(3'-carboxyphenyl) -1:3-benzotriazol,
5 - amino - 2 - (2':5' - dimethoxy - 4' - sulfophenyl) -1:3-benzotriazol,
5 - amino - 2 - (4' - chloro - 3' - sulfophenyl) - 1:3-benzotriazol,
5 - amino - 2:2' - (4':8'- - disulfonaphthyl) -1:3-benzotriazol,
5 - amino - 2:1'-(4'-sulfonaphthyl) -1:3-benzotriazol,
5 - amino - (4' - hydroxy - 3' - carboxyphenyl) -1:3-benzotriazol,
5 - amino - 2 - (4' - hydroxy - 3' - carboxy - 5' - methylphenyl) -1:3-benzotriazol and so forth.
When, in the production of the last two compounds, oxidation is effected with copper salts, the insoluble copper complexes are formed directly. These complexes are preferably converted into the soluble alkali metal salts by reaction with alkali metal sulfides.

As other benzotriazols, which can be produced by the same method as 5-amino-1:2'-(5':7'-disulfonaphthyl)-1:3-benzotriazol, the following may be mentioned:

5 - amino - 1:2' - (6' - sulfonaphthyl) - 1:3 - benzotriazol,
5 - amino - 1:1' - (6' - sulfonaphthyl) - 1:3 - benzotriazol,
5 - amino - 1:1' - (4' - sulfonaphthyl) - 1:3 - benzotriazol,
5 - amino - 1 - (4' - hydroxy - 3' - carboxyphenyl)-1:3-benzotriazol,
5 - amino - 1 - (2' - hydroxy - 3' - carboxyphenyl)-1:3-benzotriazol,
5-amino-1-(4'-sulfophenyl)-1:3-benzotriazol,
5-amino-1-(3'-carboxyphenyl)-1:3-benzotriazol,
5-sulfo-1-(4'-aminophenyl)-1:3-benzotriazol.

The last compound can be produced for example by reduction of 2-nitro-4-sulfo-4'-acetyl-amino-diphenyl amine, followed by diazotising and saponification of the acetyl amino group.

The new dyestuffs dye cotton in yellow, orange, brown-red, brown, olive and other shades. These are distinguished from the dyeings produced with the known stilbene dyestuffs in general by strongly improved water fastness, in part by improved washing fastness, light fastness and dischargeability, in part by purer shades.

The present invention is illustrated by the following examples, the parts being by weight:

EXAMPLE 1

42 parts of 2-(4''-aminophenyl)-(naphtho-1':2':4:5-triazol)-5':7'-disulfonic acid and 23.7 parts of the sodium salt of dinitrostilbene disulfonic acid are heated to boiling in a stirring vessel with 260 parts of water and 40 parts of caustic soda lye of 36° Bé. for 15 hours under reflux. The condensation product is precipitated with sodium chloride and filtered off. It is dissolved in 200 parts of water and 10 parts of caustic soda lye of 36° Bé., 100 parts of sodium hypochlorite (12% active chlorine) are added, heated for 3 hours up to 90–100° C. and after the reaction is finished, salted out with sodium chloride.

The dried dyestuff constitutes an orange powder; it dissolves in water with a yellow color, in concentrated sulfuric acid with a blue-red color and dyes cotton in light fast reddish yellow shades.

A similar dyestuff is obtained when in the above examples 47.4 parts instead of 23.7 parts of the sodium salt of dinitrostilbene disulfonic acid are used.

EXAMPLE 2

29 parts of 5-amino-2-(4'-sulfophenyl)-1:3-benzotriazol and 47.4 parts of the sodium salt of dinitrostilbene disulfonic acid are condensed for 18 hours at boiling temperature with 500 parts of water and 100 parts of caustic soda lye of 36° Bé. and worked up in the usual manner.

The dried dyestuff is a brown orange powder; it dissolves in water with an orange color, in concentrated sulfuric acid with a blue color and dyes cotton in lightfast orange shades.

When the dyestuff is treated with sodium hypochlorite, for example as indicated in Example 1, a product is obtained which dyes cotton in pure, yellowish orange shades.

EXAMPLE 3

51 parts of 5-amino-1-(3'-carboxyphenyl)-1:3-benzotriazol and 47.4 parts of the sodium salt of dinitrostilbene disulfonic acid are condensed for 15 hours at boiling temperature in 800 parts of water and 200 parts of caustic soda lye of 36° Bé. and worked up as usual. The condensation product is again dissolved in 800 parts of water and 200 parts of caustic soda lye of 36° Bé. and at 60–70° C. chlorine is introduced until the alkali is consumed. The dyestuff, separated by salting out, constitutes, when dried, a red-orange powder; it dissolves in water with a yellow color, in concentrated sulfuric acid with a blue-red color and dyes cotton in light fast yellow shades.

When in the above example only 30 parts, instead of 51 parts, of 5-amino-1-(3'-carboxyphenyl)-1:3-benzotriazol are used a similar more reddish dyeing dyestuff is obtained.

EXAMPLE 4

25.4 parts of 5-amino-2-(3'-carboxyphenyl)-1:3-benzotriazol and 47.4 parts of the sodium salt of dinitrostilbene disulfonic acid are condensed in an autoclave for 8 hours at 120–130° C. with 500 parts of water and 80 parts of caustic soda lye of 36° Bé.; after neutralising with hydrochloric acid complete precipitation is effected with sodium chloride.

The dried dyestuff constitutes an orange-brown powder; it dissolves in water with a brown-orange color, in concentrated sulfuric acid with a blue-violet color and dyes cotton in lightfast reddish-brown shades.

EXAMPLE 5

42 parts of 2-(4''-aminophenyl)-(naphtho-1':2':4:5-triazole)-5':7'-disulfonic acid, 34 parts of 2-(4''-aminophenyl)-(naphtho-1':2':4:5-triazol)-6'-sulfonic acid and 47.4 parts of the sodium salt of dinitrostilbene disulfonic acid are condensed for 12–15 hours by reflux with 500 parts of water and 80 parts of caustic soda lye 36° Bé. and the condensation product is worked up in the usual way.

The dyestuff constitutes an orange-brown powder; it dissolves in water yellow, in concentrated sulfuric acid blue-red and dyes cotton in lightfast reddish yellow shades.

When the dyestuff is treated with sodium hypochlorite, for example as indicated in Example 1, a dyestuff of similar properties is obtained, which dyes cotton in somewhat purer, greenish yellow shades.

EXAMPLE 6

30 parts of 2-(4''-aminophenyl)-(naphtho-1':2':4:5-triazole)-6'-sulfonic acid, 31 parts of the dyestuff m-amino-benzoic acid→2:5-dimethoxy aniline and 47.4 parts of the sodium salt of dinitrostilbene disulfonic acid are condensed by boiling for 12–15 hours with 700 parts of water and 120 parts of caustic soda lye of 36° Bé.

The condensation product, isolated in the usual way, is dissolved in 500 parts of water and 30 parts of caustic soda lye and heated during 3–4 hours up to 90–100° C. with 300 parts of sodium hypochlorite (12% active chlorine).

The dyestuff thus purified constitutes a brown powder; it dissolves in water with a red-orange color, in concentrated sulfuric acid with a violet color and dyes cotton in lightfast yellowish red shades.

EXAMPLE 7

25 parts of the saponified dyestuff p-aminoacet-anilide→salicylic acid, 27 parts of 5-amino-2-(4'-hydroxy-3'-carboxy-phenyl) - 1:3 - benzotriazol and 47.4 parts of the sodium salt of dinitrostilbene disulfonic acid are condensed at boiling temperature for 15–18 hours with 800 parts of water and 200 parts of caustic soda lye of 36° Bé. The condensation product is isolated in the usual way.

The dyestuff, a brown powder, dissolves in water with a brown-orange color, in concentrated sulfuric acid with a blue color and dyes cotton in brown-orange shades which by after-treatment with copper salts pass into red-brown shades, and by after-treatment with chromium salts into yellow brown shades, whilst at the same time the washing and water fastness is improved.

Example 8

18 parts of the dyestuff 2-amino-1-hydroxy-benzene-4-sulfonic acid→2:5-dimethoxy aniline, 42 parts of 2-(4''-aminophenyl) - (naphtho-1':2':4:5-triazol)-5':7'-disulfonic acid and 47.4 parts of the sodium salt of dinitrostilbene disulfonic acid are condensed by boiling for 12–15 hours with 500 parts of water and 80 parts of caustic soda lye of 36° Bé. The drawn off deposite, precipitated with sodium chloride, is again dissolved in 800 parts of water, then a solution of 14 parts of copper sulfate in 60 parts of water and 30 parts of 25% ammonia is allowed to flow in at 80–90° C. and the whole heated for 12–15 hours to 90–95° C. The metallised dyestuff is precipitated with sodium chloride and filtered off; it constitutes, when dried, a black powder, which dissolves in water with a yellow-olive color, in concentrated sulfuric acid with a violet color and dyes cotton in lightfast yellow-olive shades.

When in the above example, for example 30 parts, instead of 18 parts, of the dyestuff 2-amino-1-hydroxy-benzene-4-sulfonic acid→2:5 - dimethoxy aniline are used, the procedure being otherwise the same as above indicated, a dyestuff is obtained which dyes cotton in more greenish olive shades of similar properties.

Example 9

42 parts of the copper compound of the dyestuff 2 - amino - 1 - hydroxy - benzene-4-sulfonic acid→2:5-dimethoxy-aniline, 27 parts of 5-amino-2-(4'hydroxy-3'-carboxy-phenyl) - 1:3-benzotriazol and 47.4 parts of the sodium salt of dinitrostilbene disulfonic acid are condensed by reflux for 12–15 hours in 650 parts of water and 150 parts of caustic soda lye of 36° Bé.; after cooling neutralisation to an almost neutral reaction is effected with hydrochloric acid and treated with sodium chloride.

The isolated dyestuff constitutes a dark powder; it dissolves in water with a reddish-brown color, in concentrated sulfuric acid with a blue-red color and dyes cotton in lightfast brown shades, of which the water and washing fastness becomes improved by after treatment with copper salts.

Example 10

47 parts of 2-(4''-amino-6''-sulfonaphthyl-1)-(naphtho-1':2':4:5-triazol)-6'-sulfonic acid and 23.7 parts of the sodium salt of dinitrostilbene disulfonic acid are condensed by boiling with 260 parts of water and 40 parts of caustic soda lye 36° Bé. for 12–15 hours. The condensation product isolated in the usual manner is dissolved in 400 parts of water and 30 parts of caustic soda lye 36° Bé. and heated for 2 hours up to 70°–80° C. with 150 parts of sodium hypochlorite. The dyestuff constitutes, when dried, a brown powder which dissolves in water with an orange coloration, in concentrated sulfuric acid with violet coloration and dyes cotton with lightfast orange shades.

A similar dyestuff is obtained by using 40 parts instead of 23.7 parts of the sodium salt of dinitrostilbene disulfonic acid.

In the following Table I there are enumerated further dyestuffs obtainable according to the present invention, whilst only the limiting cases, i. e. the condensations of one or two molecules of the same amino compound with one molecule of dinitrostilbene disulfonic acid are given.

*Table I*

| Example No. | Amino compound | Condensation ratio between amino compound and dinitrostilbene disulfonic acid | (a) Dyeing on cotton, (b) after-coppered |
|---|---|---|---|
| 11 | 2-(3''-aminophenyl)-(naphtho-1':2':4:5-triazol)-5':7'-disulfonic acid | 1:1 | (a) Reddish yellow. |
| 12 | do | 2:1 | Do. |
| 13 | 2-(4''-aminophenyl)-(naphtho-1':2':4:5-triazol)-6'-sulfonic acid | 2:1 | Do. |
| 14 | 2-(4''-aminophenyl)-(naphtho-1':2':4:5-triazol)-4'-sulfonic acid | 2:1 | Do. |
| 15 | 2-(4''-aminophenyl)-(naphtho-1':2':4:5-triazol)-6':8'-disulfonic acid | 2:1 | Do. |
| 16 | 2-(4''-aminophenyl)-(naphtho-1':2':4:5-triazol)-4':8'-disulfonic acid | 2:1 | Do. |
| 17 | 2-(4''-amino-2''-sulfophenyl)-(naphtho-1':2':4:5-triazol) | 1:1 | (a) Yellow. |
| 18 | do | 2:1 | Do. |
| 19 | 2-(4''-amino-3''-sulfophenyl)-(naphtho-1':2':4:5-triazol)-6'-sulfonic acid | 2:1 | (a) Yellow-orange. |
| 20 | 2-(3''-amino-4''-chlorophenyl)-(naphtho-1':2':4:5-triazol)-5':7'-disulfonic acid | 1:1 | (a) Reddish-yellow. |
| 21 | 2-(3''-amino-4''-methylphenyl)-(naphtho-1':2':4:5-triazol)-5':7'-disulfonic acid | 2:1 | (a) Orange. |
| 22 | 2-(4''-aminophenyl)-(naphtho-1':2':4:5-triazol)-3:6:8-trisulfonic acid | 2:1 | (a) Reddish. |
| 23 | 5-amino-2:2'-(4':8'-disulfonaphthyl)-1:3-benzotriazol | 1:1 | (a) Yellow-orange. |
| 24 | 5-amino-2:1'-(4'-sulfonaphthyl)-1:3-benzotriazol | 1:1 | Do. |
| 25 | 5-amino-1:2'-(6'-sulfonaphthyl)-1:3-benzotriazol | 1:1 | Do. |
| 26 | 5-amino-1-(4'-sulfophenyl)-1:3-benzotriazol | 1:1 | (a) Reddish-yellow. |
| 27 | do | 2:1 | Do. |
| 28 | 5-amino-2-(4'-hydroxy-3'-carboxyphenyl)-1:3-benzotriazol | 1:1 | (a) Brown-orange, (b) yellow-brown. |
| 29 | 5-amino-2-(4'-methyl-3'-sulfophenyl)-1:3-benzotriazol | | (a) Orange. |
| 30 | 5-amino-2-(3':6'-dimethyl-4'-sulfophenyl)-1:3-benzotriazol | 1:1 | Do. |
| 31 | 5-sulfo-1-(4'-aminophenyl)-1:3-benzotriazol | 1:1 | (a) Yellow-orange. |
| 32 | do | 1:1 | Do. |
| 33 | 5-amino-2-(3':6'-dimethoxy-4'-sulfophenyl)-1:3-benzotriazol | 2:1 | (a) Orange. |
| 34 | 2-(2''-methoxy-4''-amino-5''-methylphenyl)-(naphtho-1':2':4:5-triazol)-6'-sulfonic acid | 1:1 | Do. |
| 35 | do | 2:1 | Do. |

In the following Tables II and III there are enumerated condensation products each of one molecule of two different amino compounds with one molecule of dinitrostilbene disulfonic acid. According to the invention the condensation may, however, be effected in other suitable ratios between at least 1 molecule and at most 2 molecules of amino compound per molecule of dinitrostilbene disulfonic acid.

*Table II*

| Example No. | 1st amino compound | 2nd amino compound | (a) Dyeing on cotton, (g) after-coppered |
|---|---|---|---|
| 36 | 2-(4''-aminophenyl)-(naphtho-1':2':4:5-triazol)-5':7'-disulfonic acid | Dehydrothio-p-toluidine-sulfonic acid | (a) Reddish-yellow. |
| 37 | ....do.... | Sulfanilic acid ⟶ 1-amino-3-methyl-6-methoxy-benzene. | (a) Orange. |
| 38 | ....do.... | m-Aminobenzoic acid ⟶ 2:5-dimethoxy aniline. | (a) Red-orange. |
| 39 | 2-(4''-aminophenyl)-(naphtho-1':2':4:5-triazol)-6'-sulfonic acid | Sulfanilic acid ⟶ 2:5-dimethoxy aniline. | Do. |
| 40 | ....do.... | m-Aminobenzoic acid ⟶ 1-amino-3-methyl-6-methoxy-benzene. | (a) Orange. |
| 41 | 5-amino-1-(3'-carboxyphenyl)-1:3-benzotriazol | m-Aminobenzoic acid ⟶ 2:5-dimethoxy-aniline. | (a) Red-orange. |
| 42 | 2-(4''-aminophenyl)-(naphtho-1':2':4:5-triazol)-5':7'-disulfonic acid | p-Aminoacet-anilide ⟶ salicylic acid, saponified. | (a) Brown-orange, (b) brown. |
| 43 | 2-(4''-aminophenyl)-(naphtho-1':2':4:5-triazol)-6'-sulfonic acid | ....do.... | Do. |
| 44 | ....do.... | p-Aminoacet-anilide ⟶ o-cresotinic acid, saponified. | Do. |
| 45 | 5-amino-1-(4'-hydroxy-3'-carboxyphenyl)-1:3-benzotriazol | p-Aminoacet-anilide ⟶ salicylic acid, saponified. | Do. |
| 46 | 5-amino-(2'-hydroxy-3'-carboxy-4'-sulfophenyl)-1:3-benzotriazol | ....do.... | Do. |

*Table III*

| Example No. | 1st amino compound | 2nd amino compound | Dyeing of the copper complex compound on cotton |
|---|---|---|---|
| 47 | 2-(4''-aminophenyl)-(naphtho-1':2':4:5-triazol)-6'-sulfonic acid | 2-amino-1-hydroxybenzene-4-sulfonic acid ⟶ m-anisidine. | Violetish-brown. |
| 48 | 2-(4''-amino-2''-sulfophenyl)-(naphtho-1':2':4:5-triazol)-6'-sulfonic acid | ....do.... | Do. |
| 49 | 2-(3''-amino-4''-methyl-phenyl)-(naphtho-1':2':4:5-triazol)-5':7'-di-sulfonic acid | 2-amino-1-hydroxybenzene-4-sulfonic acid ⟶ m-anisidine. | Brown. |
| 50 | ....do.... | 2-amino-6-chloro-1-hydroxybenzene-4-sulfonic acid ⟶ m-anisidine. | Do. |
| 51 | 2-(4-aminophenyl)-(naphtho-1':2':4:5-triazol)-6'-sulfonic acid | 2-amino-1-hydroxybenzene-4-sulfonic acid ⟶ 2:5-dimethoxy-aniline. | Olive. |
| 52 | 5-amino-2-(4'-sulfo-phenyl)-1:3-benzo-triazol | ....do.... | Do. |
| 53 | 2-(4''-aminophenyl)-(naphtho-1':2':4:5:triazol)-6'-sulfonic acid | 4-nitro-2-amino-1-hydroxybenzene ⟶ m-anisidine. | Reddish-brown. |
| 54 | 5-amino-2:2'-(4':8'-disulfonaphthyl)-1:3-benzotriazol | 4-nitro-2-amino-1-hydroxybenzene ⟶ 2:5-dimethoxy-aniline. | Brown. |
| 55 | 2-(4''-aminophenyl)-(naphtho-1':2':4:5-triazol)-6'-sulfonic acid | 4-nitro-2-amino-1-hydroxybenzene ⟶ 3'-amino-C-phenyl-1:2-N-thiazolo-5-hydroxynaphthalene-7-sulfonic acid. | Do. |
| 56 | 2-(4''-aminophenyl)-(naphtho-1':2':4:5-triazol)-5':7'-disulfonic acid | ....do.... | Do. |

Instead of the triazols cited in the above examples and tables there may also equally well be used the other compounds enumerated in the general part of the specification.

What I claim is:

1. In the manufacture of stilbene dyestuffs by condensation of dinitrostilbene disulfonic acid, dinitrodibenzyl disulfonic acid or p-nitrotoluene sulfonic acid with aromatic compounds, which contain free amino groups, in any desired proportion, in presence of caustic alkalis, with or without the application of pressure, and if desired subsequent treatment of the products with metal yielding and/or oxidising agents, the improvement wherein instead of up to two molecules of the known aromatic amino compounds there are used on one molecule of a compound selected from the group consisting of dinitrostilbene disulfonic acid, dinitrodibenzyl disulfonic acid and p-nitrotoluene sulfonic acid at least one molecule of an aminoaryltriazol of the benzene and naphthalene series containing in one of the positions 1 and 2 of the triazol ring an aryl radical selected from the group consisting of aryl radicals of the benzene and naphthalene series, said aminoaryltriazol containing at least one member of the group consisting of the sulfo and carboxy radicals and being free from —N=N— groups.

2. In the manufacture of stilbene dyestuffs by condensation of dinitrostilbene disulfonic acid, dinitrodibenzyl disulfonic acid or p-nitrotoluene sulfonic acid with aromatic compounds, which contain free amino groups, in any desired proportion, in presence of caustic alkalis, with or without the application of pressure, and if desired subsequent treatment of the products with metal yielding and/or oxidising agents, the improvement wherein instead of up to two molecules of the known aromatic amino compounds there are used on one molecule of a compound selected from the group consisting of dinitrostilbene disulfonic acid, dinitrodibenzyl disulfonic acid and p-nitrotoluene sulfonic acid together with other amino compounds whose use for this condensation is known, at least one molecule of an aminoaryltriazol of the benzene and naphthalene series containing in one of the positions 1 and 2 of the triazol ring an aryl radical selected from the group consisting of aryl radicals of the benzene and naphthalene series, said aminoaryltriazol containing at least one member of the group consisting of the sulfo and carboxy radicals and being free from —N=N— groups.

3. In the manufacture of stilbene dyestuffs by condensation of dinitrostilbene disulfonic acid, dinitrodibenzyl disulfonic acid or p-nitrotoluene sulfonic acid with aromatic compounds, which contain free amino groups, in any desired proportion, in presence of caustic alkalis, with or without the application of pressure, and if desired subsequent treatment of the products with metal yielding and/or oxidising agents, the improvement wherein instead of up to two molecules of the known aromatic amino compounds there are used on one molecule of a compound selected from the group consisting of dinitrostilbene disulfonic acid, dinitrodibenzyl disulfonic acid and p-nitrotoluene sulfonic acid together with metallisable aminoazobenzene compounds whose use for this condensation is known, at least one molecule of an aminoaryltriazol of the benzene and naphthalene series containing in one of the positions 1 and 2 of the triazol ring an aryl radical selected from the group consisting of aryl radicals of the benzene and naphthalene series, said aminoaryltriazol containing at least one member of the group consisting of the sulfo and carboxy radicals and being free from —N=N— groups, and metallizing the so-obtained condensation product.

4. In the manufacture of stilbene dyestuffs by condensation of dinitrostilbene disulfonic acid, dinitrodibenzyl disulfonic acid, p-nitrotoluene sulfonic acid with aromatic compounds, which contain free amino groups, in any desired proportion, in presence of caustic alkalis, with or without the application of pressure, and if desired subsequent treatment of the products with metal yielding and/or oxidising agents, the improvement wherein instead of the known aromatic amino compounds there are used aminonaphthotriazols which are free from —N=N— groups and which correspond to the formula

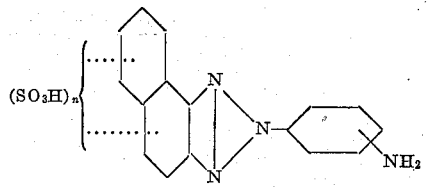

wherein n means one of 1, 2 and 3, the benzene radical containing besides the amino group substituents selected from the group consisting of H, Cl, CH₃, OCH₃ and SO₃H.

5. In the manufacture of stilbene dyestuffs by condensation of dinitrostilbene disulfonic acid, dinitrodibenzyl disulfonic acid, p-nitrotoluene sulfonic acid with aromatic compounds, which contain free amino groups, in any desired proportion, in presence of caustic alkalis, with or without the application of pressure, and if desired subsequent treatment of the products with metal yielding and/or oxidising agents, the improvement wherein instead of the known aromatic amino compounds there are used aminobenzotriazols of the formula

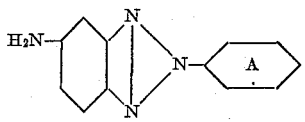

the benzene radical A containing substituents selected from the group consisting of H, CH₃, OCH₃, Cl, OH, COOH and SO₃H, said aminobenzotriazols containing at least one member of the group consisting of the sulfo and carboxy radicals and being free from —N=N— groups.

6. In the manufacture of stilbene dyestuffs the step of condensing at most two molecules of 2-(4″-aminophenyl) - (naphtho - 1′:2′:4:5 - triazol)-5′:7′-disulfonic acid with one molecular proportion of dinitrostilbene disulfonic acid.

7. In the manufacture of stilbene dyestuffs, the steps of condensing one molecular proportion of

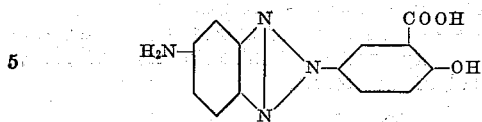

and one molecular proportion of

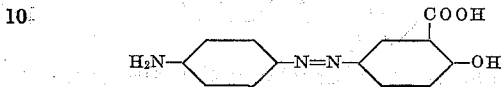

with one molecular proportion of dinitrostilbene disulfonic acid and coppering the condensation product.

8. In the manufacture of stilbene dyestuffs, the steps of condensing one molecular proportion of

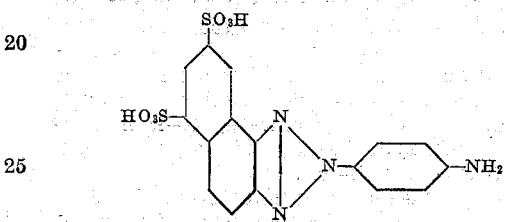

and one molecular proportion of

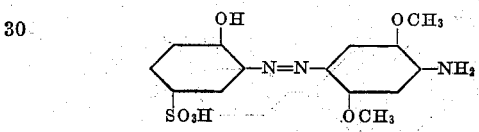

with one molecular proportion of dinitrostilbene disulfonic acid and coppering the condensation product.

9. A new stilbene dyestuff from the condensation with dinitrostilbene disulfonic acid of an amino diaryl triazol free from —N=N— groups and selected from the amino diaryl triazols of the benzene and naphthalene series containing at least one member of the group consisting of the sulfo and carboxy radicals and, in one of the positions 1 and 2 of the triazol ring, an aryl radical selected from the group consisting of aryl radicals of the benzene and naphthalene series, the other aryl radical of the amino diaryl triazol being free from hydroxy groups.

10. A new stilbene dyestuff from the condensation with dinitrostilbene disulfonic acid of an amino compound and an amino diaryl triazol free from —N=N— groups and selected from the amino diaryl triazols of the benzene and naphthalene series containing at least one member of the group consisting of the sulfo and carboxy radicals and, in one of the positions 1 and 2 of the triazol ring, an aryl radical selected from the group consisting of aryl radicals of the benzene and naphthalene series, the other aryl radical of the amino diaryl triazol being free from hydroxy groups.

11. A new stilbene dyestuff from the condensation with dinitrostilbene disulfonic acid of an aminotriazol of the formula

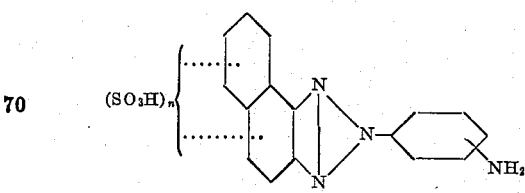

wherein n means one of 1, 2 and 3, the benzene radical containing besides the amino group substituents selected from the group consisting of H, Cl, CH₃, OCH₃ and SO₃H, said aminotriazol being free from —N=N— groups.

12. A new stilbene dyestuff from the condensation with dinitrostilbene disulfonic acid of an aminotriazol of the formula

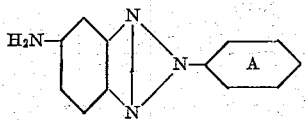

the benzene radical A containing substituents selected from the group consisting of H, CH₃, OCH₃, Cl, OH, COOH and SO₃H, said aminotriazol containing at least one member of the group consisting of the sulfo and carboxy radicals and being free from —N=N— groups.

13. The new stilbene dyestuff from the condensation with dinitrostilbene disulfonic acid of 2-(4″-aminophenyl)-(naphtho-1′:2′:4:5-triazol)-5′:7′-disulfonic acid, being in the form of the sodium salt an orange powder dissolving with yellow color in water, with blue-red color in concentrated sulfuric acid and dyeing cotton in light fast reddish yellow shades.

14. The new stilbene dyestuff from the condensation with one molecular proportion of dinitrostilbene disulfonic acid of one molecular proportion of

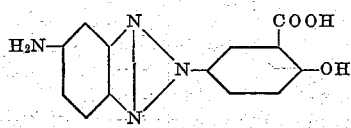

and one molecular proportion of

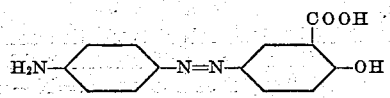

said dyestuff being in the form of the sodium salt a brown powder, dissolving in water with a brown-orange color, in concentrated sulfuric acid with a blue color and dyeing cotton in brown-orange shades which by after-treatment with copper salts pass into red-brown shades of improved water and washing fastness.

15. The new stilbene dyestuff from the condensation with one molecular proportion of dinitrostilbene disulfonic acid of one molecular proportion of

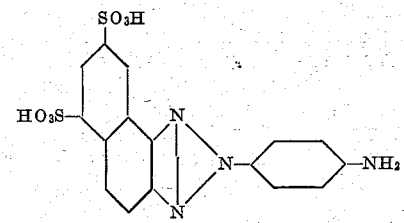

and one molecular proportion of

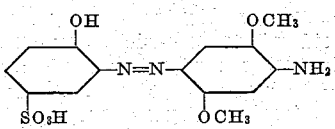

and treatment with a copper salt, said dyestuff being in the form of the sodium salt a black powder, dissolving in water with a yellow olive color, in concentrated sulfuric acid with a violet color and dyeing cotton in lightfast yellow olive shades.

ERNST KELLER.